United States Patent
Leatherbury et al.

[11] Patent Number: 5,700,021
[45] Date of Patent: Dec. 23, 1997

[54] MOBILE CART

[75] Inventors: Colin C. Leatherbury, Batesville, Ind.; Donavan O. Kerr, Cincinnati, Ohio

[73] Assignee: C.C. Leatherbury, Inc., Batesville, Ind.

[21] Appl. No.: 513,001

[22] Filed: Aug. 9, 1995

[51] Int. Cl.⁶ .................................................. B62B 3/00
[52] U.S. Cl. ......................... 280/47.35; 280/47.34; 280/DIG. 4
[58] Field of Search ................. 280/33.991, 33.992, 280/33.995, 33.996, 47.34, 47.35; 220/491, 743, 486, 485; 224/411

[56] References Cited

U.S. PATENT DOCUMENTS

| | | | |
|---|---|---|---|
| D. 152,666 | 2/1949 | Williams | 280/47.35 |
| D. 346,473 | 4/1994 | Hubble | D34/19 |
| 1,763,174 | 6/1930 | Morris | 220/485 |
| 2,888,761 | 6/1959 | Miller | 280/33.992 |
| 3,118,553 | 1/1964 | Rosenzwieg | 280/47.34 |
| 3,361,438 | 1/1968 | Davis | 280/33.991 |
| 3,532,246 | 10/1970 | Wenta | 220/491 |
| 3,813,111 | 5/1974 | Ruger | 280/33.991 |
| 3,837,667 | 9/1974 | Senovitz | 280/47.34 |
| 4,097,056 | 6/1978 | Castellano | 280/47.35 |
| 4,235,450 | 11/1980 | Conover | 280/47.32 |
| 4,487,134 | 12/1984 | Foote | 280/33.992 |
| 4,555,124 | 11/1985 | Millington | 280/33.992 |
| 4,650,199 | 3/1987 | Rehrig | 280/DIG. 4 |
| 4,840,388 | 6/1989 | Doughty | 280/33.994 |
| 5,020,811 | 6/1991 | Ondrasik | 280/33.993 |
| 5,106,111 | 4/1992 | Ondrasik | 280/33.991 |
| 5,238,256 | 8/1993 | Ondrasik | 280/33.991 |
| 5,294,009 | 3/1994 | Maurer et al. | 280/47.35 |
| 5,350,182 | 9/1994 | Hurst | 280/33.996 |
| 5,544,904 | 8/1996 | Maher | 280/47.35 |
| 5,595,394 | 1/1997 | Adamson | 280/47.35 |

FOREIGN PATENT DOCUMENTS

| | | | |
|---|---|---|---|
| 1106825 | 12/1955 | France | 220/491 |
| 2341130 | 3/1975 | Germany | 280/47.35 |

*Primary Examiner*—Brian L. Johnson
*Assistant Examiner*—Min Yu
*Attorney, Agent, or Firm*—Baker, Donelson, Bearman & Caldwell

[57] ABSTRACT

A mobile cart having particular utility when used as a grocery, or shopping cart. The cart comprises a frame, a basket operable for receiving articles and attached to an upper platform portion of the frame, and a rack vertically spaced from the basket and attached to a lower base portion of the frame. The cart further includes a plurality of swiveling, wheeled casters mounted on the lower base portion thereby permitting the cart to be easily propelled in any direction by the cart operator. The frame is configured to dispose the basket at a comfortable working height for the cart operator and to provide the operator with easy access to the rack. The frame is constructed of hollow metallic tubing so as to provide the required structural rigidity while minimizing weight. The basket may include a generally centrally disposed and downwardly extending depression formed in the basket floor which is effective for receiving articles and lowering the center of gravity of the basket so as to enhance the stability of the cart. The basket and rack are constructed of a rigid metallic wire mesh structure which may be coated with polyvinyl material so as to enhance the maintainability and visual appeal of the cart.

22 Claims, 5 Drawing Sheets

MOBILE CART

BACKGROUND OF THE INVENTION

1.0 Field of the Invention

The present invention relates generally to a mobile cart, and more particularly, to a mobile cart having particular utility for use as a shopping cart, which is sized and designed to facilitate intermediate or supplemental shopping.

2.0 Related Art

The development of the current fast-paced society has brought about changes in the shopping habits of the American family. Shopping for groceries in a leisurely fashion for instance is a declining activity. Today's hurried families do the bulk of their shopping on a weekly, bi-weekly, or even on a monthly basis and then make supplemental purchases throughout the week as immediate needs arise. Large floorplan grocery stores are common which offer attractive price and selection of goods, but the sheer size of these stores, which are often measured in acres, make supplemental shopping inconvenient. The success and proliferation of the "convenient store" attests to this fact.

Known shopping, or grocery carts include those disclosed in the following U.S. Pat. Nos. 4,840,388 issued to Robert E. Doughty; 5,238,256 issued to John Ondrasik; and 5,350,182 issued to Jack W. Hurst. Such carts are typically offered to the customer by stores to make shopping easier and more convenient. Although these and other similar known carts do offer convenience for the bulk shopper, primarily due to large basket capacity, they include inherent functional disadvantages that outweigh the advantages for the supplemental shopper. Such carts are typically relatively large, heavy, and may be unstable when loaded, rendering them difficult to push and clumsy to maneuver. This problem is exacerbated since known shopping carts typically use swiveling casters on only the front end of the cart and utilize fixed, or non-swiveling casters on the rear end of the cart which inhibits, or may prevent, lateral movement of the cart. This is especially burdensome for aged shoppers. Additionally, these carts are normally only available at the store entrance, and the basket capacity is typically much more than needed by the supplemental shopper. As a further disadvantage, the undercarriage tray, or bottom rack, common to most known shopping carts is designed to accommodate bulk items such as bags of dog and cat food, cases of beverage and similar items. Loading items onto this rack is difficult and the available storage space is often minimal. The shopper must typically move to the front of the cart, bend down at an awkward angle, then attempt to maneuver the heavy, bulky items through the narrow space between the top basket and the bottom rack. The shopper is then required to repeat this uncomfortable procedure at the check-out stand where it is necessary to remove the items. These disadvantages discourage the supplemental shopper from using conventional, large carts, causing some shoppers to elect to hand carry their purchases. This potentially reduces sales and store profits.

Another disadvantage of known shopping carts is that they typically are complex in design and construction. For instance, such carts may be designed to facilitate nesting with other carts, to provide for integral child seating and tilting bottom trays. Such features may result in a cart which is unnecessarily complex and expensive to meet the needs of supplemental shoppers.

Many stores also provide hand baskets as an alternative to the common shopping cart. However, these hand baskets usually do not satisfy the shopping practices of the supplemental shopper for the following reasons. The basket often becomes heavy and unwieldy as more items are added then were initially anticipated due to the availability of sale items and additional purchases sparked by remembered needs. Additionally, the hand basket must often be placed on the floor in areas where both hands are used in making selections. This may also be the case where extended waiting is necessary, such as the meat counter, the delicatessen and the check-out aisle. Due to the foregoing disadvantages, many supplemental shoppers will elect to hand carry their purchases rather than utilize a hand basket, thus potentially reducing purchases and store profits.

Another attempt to remedy some of the foregoing deficiencies of known, large shopping carts has been to produce smaller carts which are scaled down versions of the larger carts. Accordingly, these smaller carts include many of the same deficiencies as the larger versions and have been largely rejected by both the shopper and store owner. Although some of these carts include a tiltable tray which make loading the bottom rack somewhat easier, the tiltable tray has not solved the problem of minimal load space and the need to change position to load the bottom rack.

Accordingly, prior to the present invention a need existed for an improved grocery cart eliminating the foregoing problems associated with known carts and providing an attractive option to the use of hand-held baskets. No purchase transport device such as the mobile cart of the present invention, is known to exist by the inventors that meets the needs of the fast-paced shopper not opting for a large cart or a hand-held basket.

SUMMARY OF THE INVENTION

Accordingly, the present invention is directed to a mobile cart having particular utility when used as a shopping, or grocery cart. According to a preferred embodiment of the present invention, the cart comprises a frame including a lower base portion, an upper platform portion vertically spaced from the lower base portion, and a connecting portion extending between and attached to the lower base portion and the upper platform portion. The cart further comprises a basket attached to the upper platform portion and vertically spaced from the lower base portion, with the basket being operable for receiving articles from an operator of the cart. The cart further includes a plurality of casters mounted on the lower base portion. The connecting portion extends upward from a first end of the lower base portion and the platform is cantilevered from an upper portion of the connecting portion so as to dispose the basket at a comfortable working height for the operator of the cart, to provide the operator easy access to the base portion and to maximize a space existing between the basket and the lower base portion.

According to other preferred embodiments, the cart may include the following additional structural features and functions. The basket includes an open top, a floor vertically spaced from the top, a pair of longitudinally spaced end walls attached to and extending upward from the floor, and a pair of laterally spaced side walls attached to and extending upward from the floor and attached to each of the end walls. The basket may further include a generally centrally disposed and downwardly extending depression formed in the floor, with the depression being operable for receiving articles from the operator of the cart and being effective for lowering a center of gravity of the basket thereby enhancing the stability of the cart.

The cart may further include a rack attached to the lower base portion of the frame, with the rack comprising a wire mesh structure. Additionally, the cart may further include a handle portion attached to the upper platform portion of the frame.

BRIEF DESCRIPTION OF THE DRAWINGS

The structural features and functions of the present invention will become more apparent from the following detailed description of the preferred embodiments when taken in conjunction with the accompanying drawings in which.

DETAILED DESCRIPTION

Figure 1:
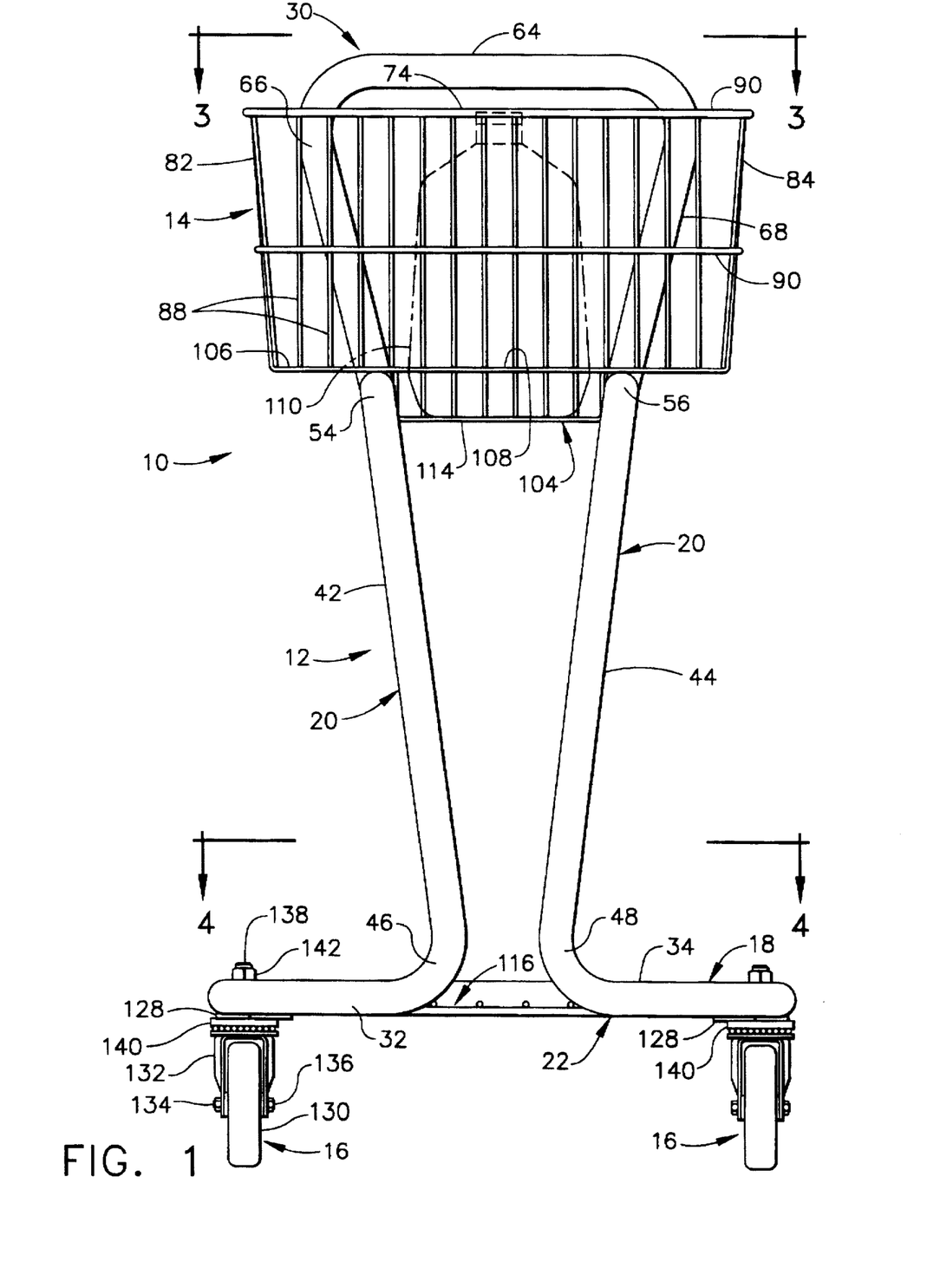
FIG. 1 is a front elevation view illustrating a mobile cart according to the present invention.
Figure 2:
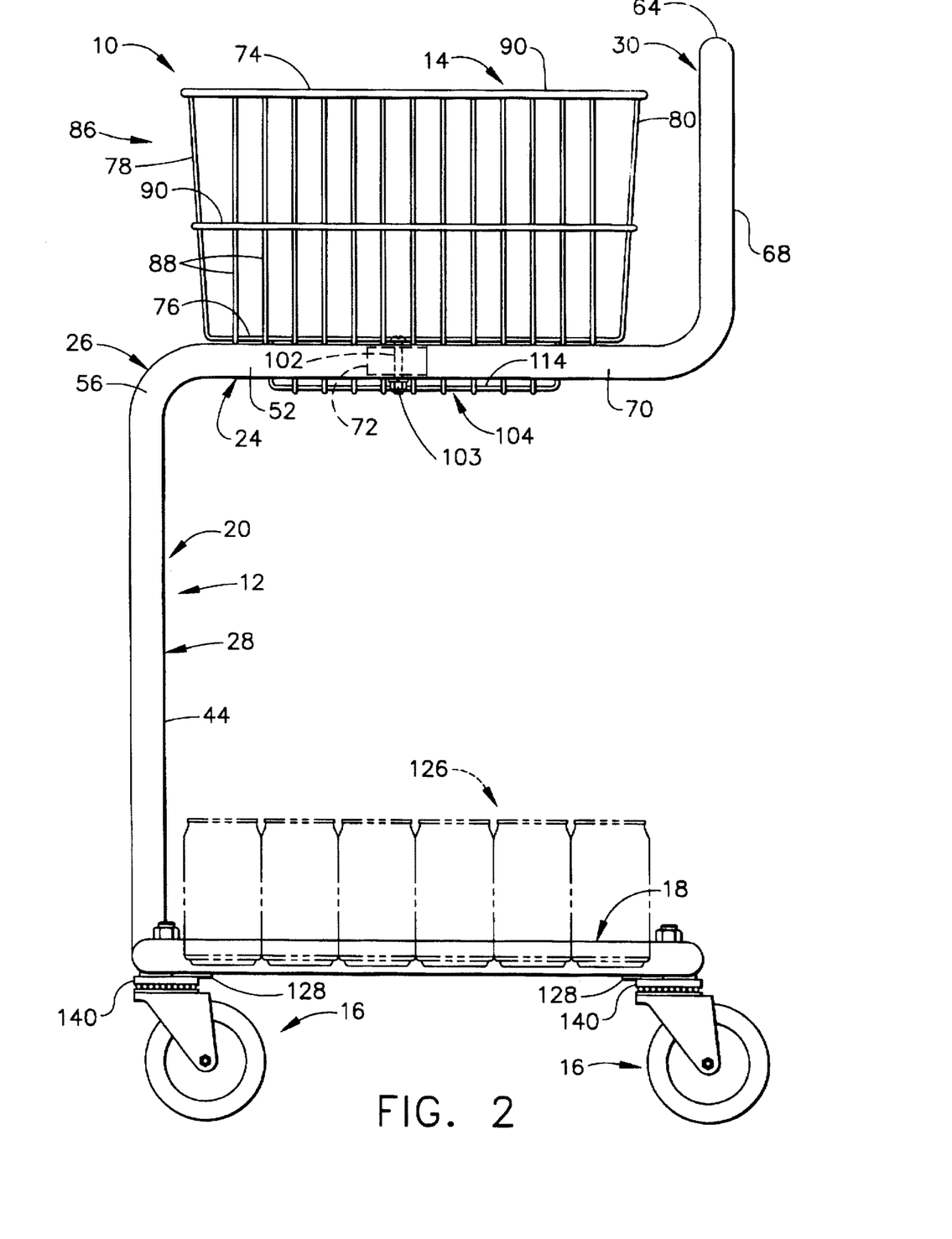
FIG. 2 is a side elevation view further illustrating the mobile cart shown in FIG. 1.

Referring now to the drawings, wherein like reference numerals have been used for similar elements throughout, FIGS. 1 and 2 are front and side elevation views, respectively, illustrating a mobile cart 10 according to the present invention. Mobile cart 10 is particularly suited for use as a grocery, or shopping cart, and comprises a frame 12, a basket 14 attached to frame 12, and a plurality of casters 16 mounted on frame 12. The frame 12 includes a substantially horizontal lower base portion 18 having a generally rectangular shape. Frame 12 further includes a connecting portion 20 which extends upward solely from a first end 22 of the lower base portion 18 and a platform portion 24 which is cantilevered from an upper portion 26 of the connecting portion 20, so as to dispose the basket 14 at a comfortable working height for the operator (not shown) of the cart, to provide the operator with easy access to the lower base portion 18, and to maximize a space existing between basket 14 and the lower base portion 18 for a given comfortable working height of basket 14. The comfortable working height of basket 14, comprising the vertical distance between the bottom of casters 16 and the uppermost portion of basket 14, may preferably range from approximately 32 inches to approximately 36 inches, but may vary somewhat from this range. As best seen in FIG. 2, the upper portion 26 of the connecting portion 20 of frame 12 preferably has an arcuate shape as viewed in side elevation. The connecting portion 20 further includes a substantially vertical riser portion 28 extending between and attached to the lower base portion 18 and the upper portion 26 of connecting portion 20. Both the lower base portion 18 and upper platform portion 24 are substantially horizontal. Accordingly, the upper platform portion 24 is substantially perpendicular to the riser portion 28 and is substantially parallel to the lower base portion 18. Due to the configuration of frame 12, the available storage space between the lower base portion 18 and the upper platform portion 24 is maximized and provides relatively unobstructed access for the operator of cart 10. Frame 12 further includes a handle portion 30 which is attached to the upper platform portion 24 in a manner which is subsequently described in greater detail. The lower base portion 18, connecting portion 20, upper platform portion 24 and handle portion 30 are preferably made of a metallic tubular construction utilizing tubes having a generally circular cross-section. Alternatively, rectangular or square metallic tubing may be used to construct the elements of frame 12.

Figure 3:
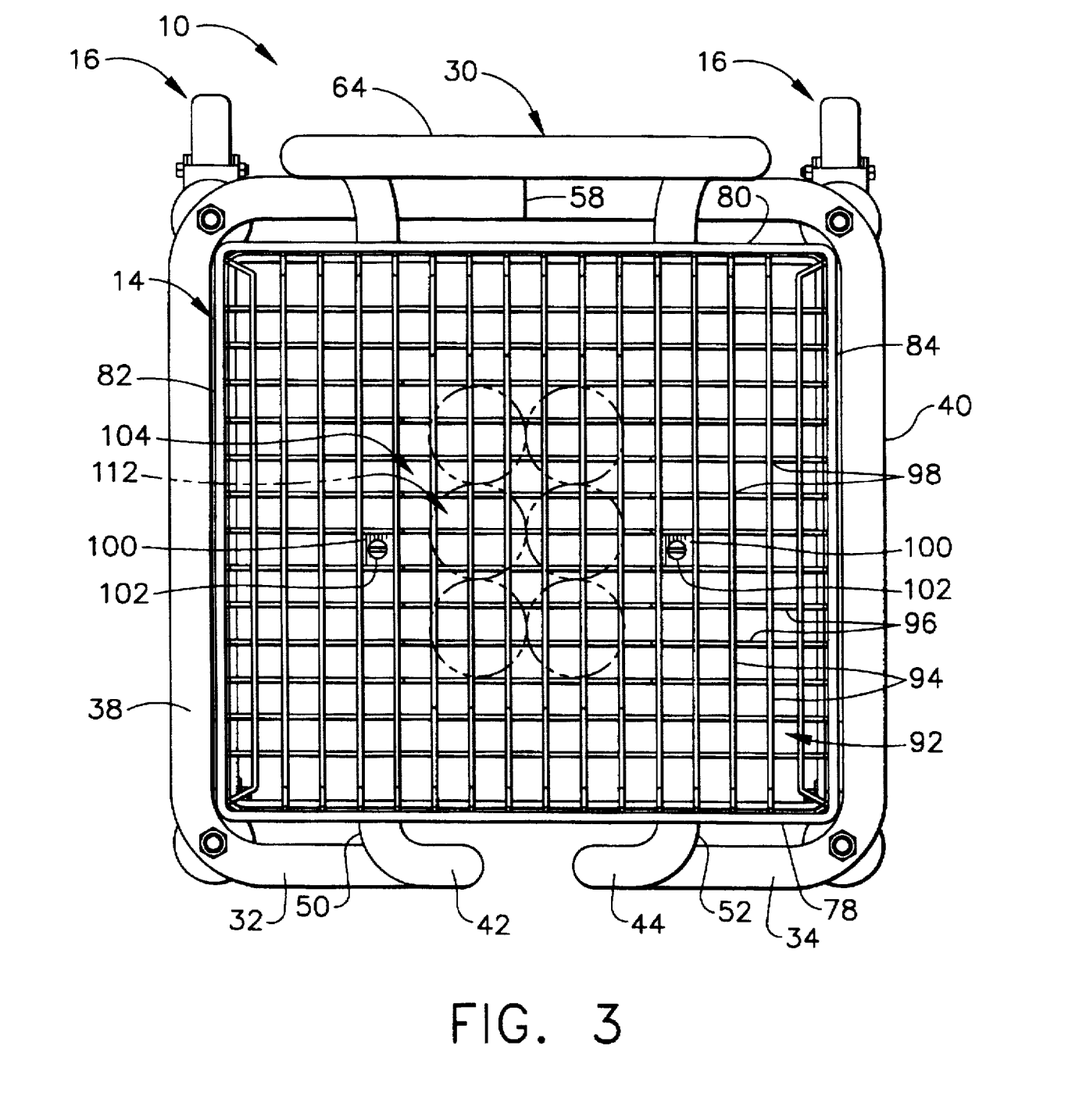
FIG. 3 is a top plan view, taken along line 3—3 in FIG. 1.

The first end 22 of the lower base portion 18 is discontinuous and includes first and second laterally extending and laterally spaced tubular members 32 and 34, respectively. The lower base portion 18 further includes a rear end 36, comprising a laterally extending tubular member, which is longitudinally spaced from the front end 22 of the lower base portion 18. Base portion 18 further includes a first longitudinally extending tubular side member 38 attached to and inter-connecting rear end 36 and the tubular member 32 of front end 22, and a second longitudinally extending tubular side member 40 attached to and inter-connecting rear end 36 and the tubular member 34 of the front end 22. The front end 22, rear end 36 and longitudinally extending side members 38 and 40 combine to form a generally rectangular shape of the lower base portion 18, as seen in a plan view such as FIGS. 3 and 4, and provides a rigid structure of base portion 18. The riser portion 28 comprises first and second substantially vertical tubular members 42 and 44 which are laterally spaced from one another. According to a preferred embodiment, members 42 and 44 diverge laterally away from one another from the lower base portion 18 toward the upper platform portion 24. However, other shapes and relative positioning of members 42 and 44 are considered to be within the scope of the present invention. The vertical tubular member 42 is attached at a lower end 46 to the tubular member 32 of front end 22 and member 44 is attached at a lower end 48 to the tubular member 34 of front end 22. As best seen in FIGS. 2 and 3, the upper platform portion 24 includes a first substantially horizontal tubular member 50 and a second substantially horizontal tubular member 52 which is laterally spaced from member 50. As best seen in FIGS. 1 and 2, the upper portion 26 of connecting portion 20 of frame 12 comprises first and second laterally spaced arcuate tubular members 54 and 56, respectively. The arcuate tubular member 54 is attached to an upper end of the vertical tubular member 42 of riser portion 28 and is also attached to the substantially horizontal tubular member 50 of the upper platform portion 24, so as to inter-connect tubular members 42 and 50. Similarly, the arcuate tubular member 56 is attached to an upper end of the vertical tubular member 44 of riser portion 28 and is also attached to the substantially horizontal tubular member 52 of the upper platform portion 24, so as to inter-connect the tubular members 44 and 52. In order to provide the required structural rigidity of frame 12, the inventors have determined that the various tubular members of the lower base portion 18, connecting portion 20 and the upper platform portion 24 may be constructed of substantially round, hollow tubing having an outside diameter of approximately 1.0 inch and a wall thickness of approximately 0.083 inches, made from commercially available carbon steel. The tubing may comprise conventionally manufactured round tubing conforming with the requirements of specification ASTM 513. Alternatively, the various members of the lower base portion 18, connecting portion 20 and the upper platform portion 24 may be made of round tubing made from another material and having a different size, provided similar structural rigidity is obtained as compared to the foregoing illustrative size and material. Additionally, as mentioned previously, the various tubular members of the lower base portion 18, connecting portion 20 and the upper platform portion 24 may alternatively be constructed from conventional rectangular or square metallic tubing. Based on the currently available equipment which is capable of bending the relatively large diameter and thick-walled tubing of frame 12, at the relatively small bend radii included in frame 12, the inventors have determined that for ease of manufacturing and cost considerations a butt-welded joint may be included in approximately the center of the rear end 36 of the base portion 18, as indicated generally at 58. A first tube may be formed to create a first portion 60 of end 36, as well as side wall 40 and tubular member 34 of base portion 18, member 44 of riser portion 28, arcuate tubular member 56 of connecting portion 20 and member 52 of platform portion 24. A second tube may be used to form a second portion 62 of rear end 36 of base portion 18, side member 38 and front end member 32 of base portion 18, as well as member 42 of riser portion 28, arcuate tubular member 54 of connecting portion 20 and member 50 of the platform portion 24. As an alternative to the butt-welded joint 58, a tubular sleeve (not shown) having an outside diameter approximating the inside diameter of the tubes used to form portions 60 and 62 of rear end 36, may be inserted into each of the portions 60 and 62 to further strengthen the joint between the two tubes. Additionally, as tube bending technology advances, it is anticipated that as a further alternative base portion 18, connecting portion 20 and upper platform portion 24 may be made of a unitary construction, i.e. formed from a single tube. Handle portion 30 of frame 12 is formed separately from the remaining elements of frame 12 and includes a generally horizontally extending upper tubular member 64, and first and second laterally spaced and generally vertically extending members 66 and 68, respectively, which are attached at an upper end to member 64. Handle portion 30 further includes a pair of laterally spaced lower, substantially horizontal members 70 (only one shown). A first one of the pair of members 70 is attached at a rear end thereof to a lower end of the generally vertically extending member 68 and is further attached at a forward end thereof to the substantially horizontal member 52 of the upper platform portion 24. The second one of the pair of members 70 is attached at a rear end thereof to a lower end of the generally vertically extending member 66 and is further attached, at a forward end thereof, to the substantially horizontal member 50 of the upper platform portion 24. Members 64, 66, 68 and each of the members 70 are preferably made of a unitary construction, i.e. formed from a single tube. The inventors have determined that a lighter gauge tube may be used to form handle portion 30, such as a steel tube having an outside diameter of approximately 1.0 inch and a wall thickness of approximately 0.065 inches. Each of the members 70 includes a swaged forward end 72 having an outside diameter which may be reduced by cold-working methods so that the outside diameter of each swaged end 72 approximates the inside diameter of tubular members 50 and 52. The swaged end 72 of a first one of the members 70 is then inserted into tubular member 52, so as to attach the first member 70 and member 52 to one another, as shown in FIG. 2. Similarly, the swaged end 72 of the second one of the tubular members 70 is inserted into tubular member 50, so as to attach the second member 70 and member 50 to one another. If rectangular or square tubing is utilized to construct frame 12, the configuration and assembly of frame 12 may be modified somewhat from the foregoing description due to the inherent difficulty in bending rectangular or square tubing without incurring undesirable crimping or wrinkling of the tubes. For instance, if rectangular or square tubing is utilized, the upper portion 26 of connecting portion 20 may be substantially straight when viewed in side elevation, rather than having the arcuate shape illustrated in FIG. 2, and may be conventionally welded to the riser portion 28 and the upper platform 24. Similarly, the lower ends 46 and 48 of members 42 and 44, respectively, of riser portion 28 may be replaced with a pair of substantially straight members interconnecting and welded to the riser portion 28 and the lower base portion 18. Additionally, if rectangular or square tubing is utilized the arcuate transitions between other elements of frame 12, such as that existing between side member 38 of lower base portion 18 and member 32 of front end 22 of lower base portion 18, may be replaced with substantially rectangular or square welded joints. After assembling the various elements of frame 12, a powdered coating, or paint, may be applied to frame 12 to enhance the durability and appearance of frame 12. Alternatively, a polyvinyl coating or a metallic plating may be applied to frame 12.

Basket 14 includes a generally rectangular and open top 74 and a floor 76 which is vertically spaced from top 74. Basket 14 further includes a front end wall 78 and a rear end wall 80 which is longitudinally spaced from front end war 78. Each of the end wars 78 and 80 are attached to floor 76. Basket 14 further includes first and second laterally spaced side walls 82 and 84, respectively, which are attached to floor 76 and to each of the end walls 78 and 80. Front end wall 78, rear end wall 80, and side walls 82 and 84 extend upward from floor 76 and are constructed of a rigid mesh, indicated generally at 86, comprising a plurality of spaced, generally vertically extending struts 88 and a plurality of vertically spaced, generally horizontally extending braces 90 attached to struts 88 at the intersections thereof, by conventional means such as resistance or spot welding, so as to maintain struts 88 in spaced relationship. Struts 88 and braces 90 preferably comprise conventional metallic wires which are coated with a polyvinyl material, such as a thermal-clad polyvinyl material, after wires 88 and 90 have been attached to one another. The inventors have determined that the upper one of the braces 90 may be made from standard three gauge wire, the lower one of the braces 90 may be made from standard seven gauge wire, and struts 88 may be made from standard eleven gauge wire. However, braces 90 and struts 88 may be made of different gauge wires provided that sufficient structural rigidity of basket 14 is achieved. Additionally, the upper one of braces 90 may alternatively be made from round, rectangular, or square tubing. The polyvinyl coating enhances the durability and visual appeal of basket 14 and provides a soft, pleasing feel when touched by the operator of cart 10. Accordingly, the application of the polyvinyl coating to basket 14 permits the cart operator to comfortably propel cart 10 by grasping a portion of basket 14, such as the upper one of braces 90, if desired rather than applying a propelling force to handle portion 30. The top 74 and the floor 76 of basket 14 each have a generally rectangular shape, with the size of floor 76 being smaller than the size of top 74. Each of the end walls 78 and 80 and side walls 82 and 84 are preferably inclined relative to vertical. End walls 78 and 80 are inclined longitudinally inward from the top 74 toward floor 76 and side walls 82 and 84 are inclined laterally inward from the top 74 toward floor 76 so as to accommodate a reduced size of floor 76 relative to top 74. In a preferred embodiment top 74 may be sized to be approximately 15.5 inches×16.5 inches and each of the end walls 78 and 80 and sidewalls 82 and 84 is inclined by approximately 1.0 inch. However, other sizes of top 74 and amounts of inclination are considered to be within the scope of the present invention.

Floor 76 is constructed of a generally square-shaped rigid mesh, indicated generally at 92, with mesh 92 comprising a plurality of laterally spaced wires 94, and a plurality of longitudinally spaced wires 96. Wires 94 and 96 are attached to one another at the intersections 98 thereof, by conventional means such as resistance or spot welding. As with the remainder of basket 14, the wires 94 and 96 of floor mesh 92 are then coated with a polyvinyl material. Basket 14 further includes a pair of tabs 100 attached to the rigid mesh 92 of floor 76. Basket 14 is attached to the upper platform portion 24 of frame 12 by conventional fasteners such as machine screws 102, lockwashers (only one shown), and nuts 103 (only one shown). Each screw 102 is inserted through a hole formed in one of the tabs 100 and then through an outer hole and an inner hole formed in one of the tubular members 50 and 52 of the upper platform portion 24 so that each screw 102 passes through one of the members 50 and 52. Basket 14 is then secured to members 50 and 52 by positioning one of the lockwashers on the lower end of each screw 102 and then threading a nut 103 onto the lower end of each screw 102.

Basket 14 further includes a generally centrally disposed and downwardly extending depression or recess 104 formed in the floor 76 of basket 14. As shown in FIGS. 1 and 2, depression 104 is approximately equally spaced laterally from side walls 82 and 84 of basket 14 and is approximately equally spaced longitudinally from end walls 78 and 80 of basket 14. Depression 104 extends below a substantially planar portion 106 of floor 76 and is shaped as a hollow parallelepiped having an open top 108 which is co-planar with portion 106 of floor 76, and therefore depression 104 is effective for lowering a center of gravity of basket 14. Wires 94 and 96 of the mesh 92 of floor 76 are generally horizontally extending throughout the substantially planar portion 106 of floor 76 and are shaped as required in the remaining portion of floor 76 to form depression 104. Depression 104 is operable for receiving articles from the operator of cart 10 and is particularly effective for receiving singular heavy objects, such as a milk bottle 110 illustrated in phantom in FIG. 1 or a six-pack of sodas 112 illustrated in phantom in FIG. 3. Depression 104 is disposed laterally between members 50 and 52 of the upper platform portion 24 of frame 12. The use of the centrally disposed depression or recess 104, comprising a receptacle, to contain relatively heavy and bulky items such as milk bottle 110 and sodas 112 enhances the stability of cart 10. The stability of the novel cart 10 of the present invention is further enhanced by the relative size and positioning of basket 14 as compared to the lower base portion 18. The generally rectangular top 74 of basket 14 is sized to be smaller than the generally rectangular base portion 18 of frame 12 so that basket 14 is disposed within an upward projection of lower base portion 18, thereby avoiding any overhung loads outside of the upward projection of lower base portion 18 due to the placement of articles within basket 14. Depression 104 includes a floor 114 which may have either a generally rectangular or a generally square shape, depending upon application. Additionally, in certain applications, recess 104 may be omitted so that the entire floor 76 of basket 14 is substantially planar, such as portion 106 of floor 76.

Figure 4:
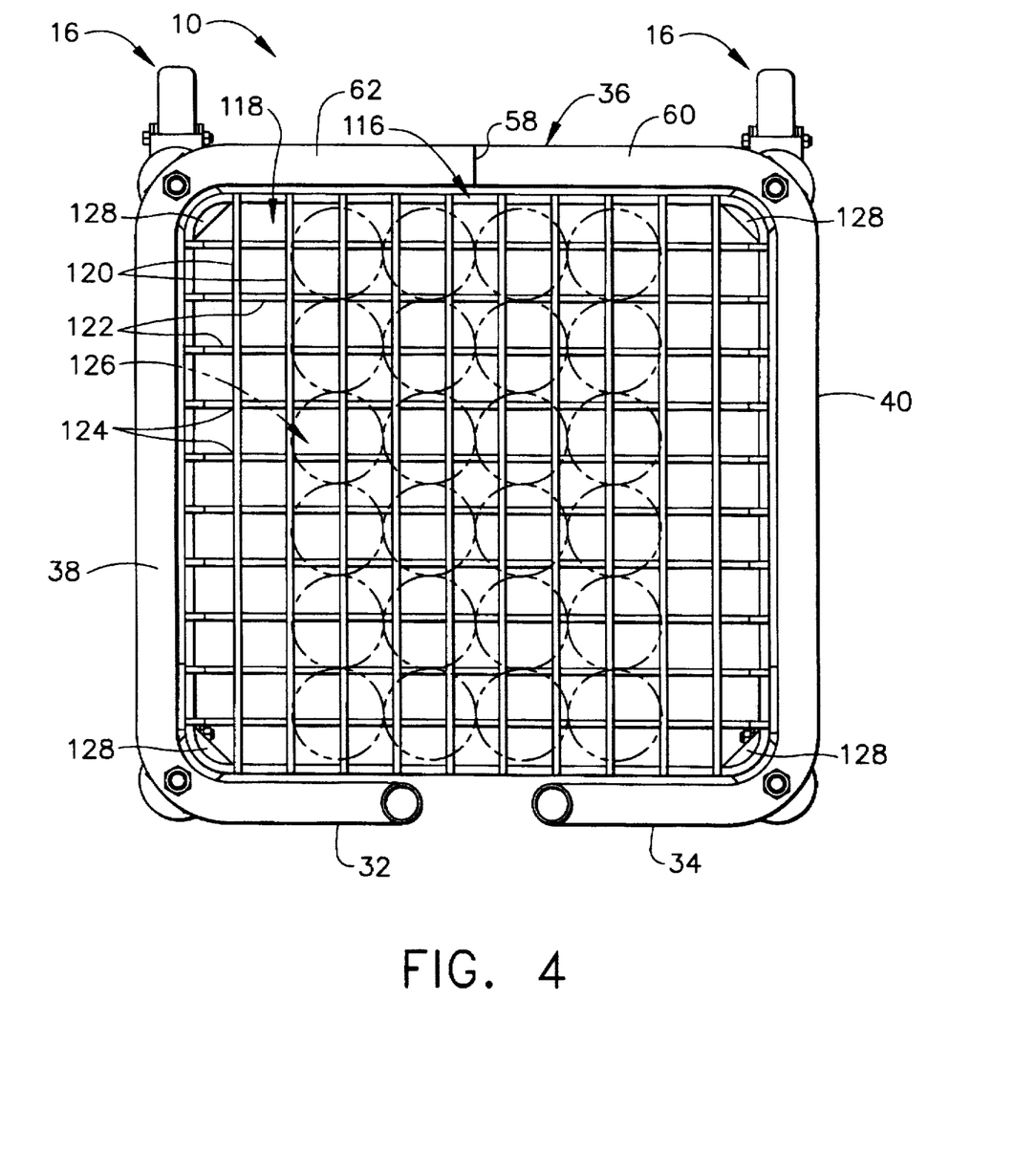
FIG. 4 is a sectional view taken along line 4—4 in FIG. 1.

As best seen in FIG. 4, cart 10 further includes a substantially planar rack 116 attached to the lower base portion 18 of frame 12. Rack 116 is constructed of a metallic, generally square-shaped rigid wire mesh, indicated generally at 118. Mesh 118 comprises a first plurality of generally horizontally extending and laterally spaced wires 120 and a second plurality of generally horizontally extending and longitudinally spaced wires 122. Wires 120 are attached to wires 122 at intersections 124 thereof by conventional means such as resistance or spot welding, in a fashion similar to that described previously with respect to the floor 76 of basket 14. Also similar to basket 14, the wires 120 and 122 of mesh 118 are coated with a polyvinyl material after wires 120 and 122 have been attached to one another. The substantially planar rack 116 is sized so as to accommodate relatively large, heavy items such as a twenty-four pack of sodas 126, illustrated in phantom in FIG. 2. Due to the previously described configuration of frame 12, rack 116 may be easily accessed and loaded by the operator of cart 10. Rack 116 includes a plurality of tabs 128, with one of the tabs 128 disposed at each of the four corners of rack 116, which are used to attach rack 116 to the lower base portion 18 of frame 12 as subsequently described. Casters 16 comprise commercially available, conventional swiveling casters, with each swiveling caster 16 including a wheel 130 rotatably mounted on a bracket 132 by conventional means such as bolt 134 and nut 136. Swiveling caster 16 further includes a stud 138 protruding upward from bracket 132 and a bearing 140 which allows caster 16 to swivel about a generally vertical axis (not shown) coincident with the longitudinally centerline of stud 138. Additionally, wheel 130 may rotate, in a conventional manner, about an axis (not shown) passing through the centerline of bolt 134. The stud 138 of each caster 16 is inserted through a hole formed in one of the tabs 128 and then through a hole formed in the lower base portion 18. Each caster 16 is then secured to base portion 18 by a nut 142 threaded onto stud 138. The incorporation of four swiveling wheeled casters 16 in cart 10, allows cart 10 to be easily propelled in any direction by the operator of cart 10. This contrasts with typical conventional carts which utilize a pair of swiveling casters on the front end of the cart and a pair of fixed casters on the rear end of the cart, with the fixed casters inhibiting or even preventing lateral movement of the cart.

Figure 5:
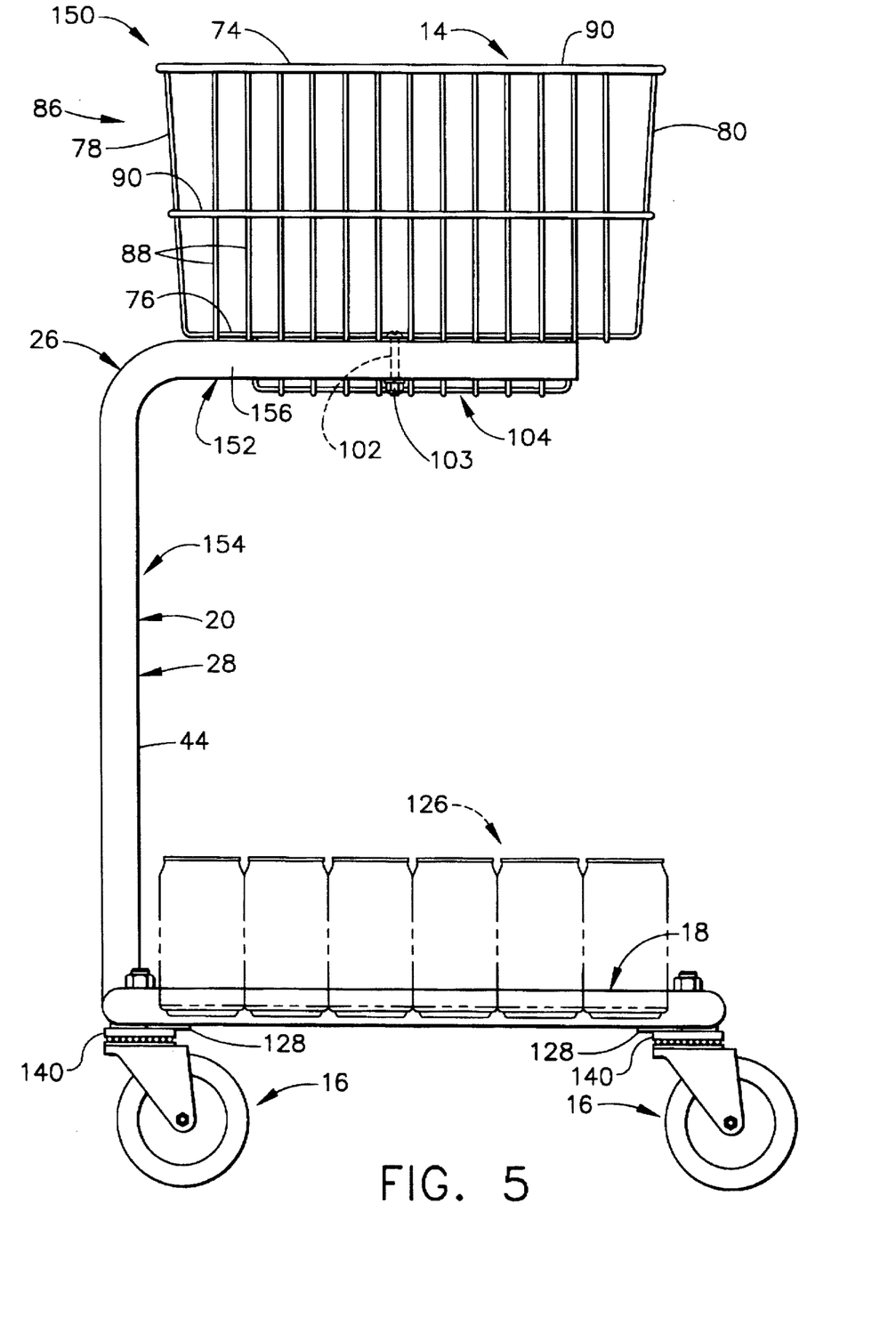
FIG. 5 is a side elevation view, similar to FIG. 2, illustrating a mobile cart according to an alternative embodiment of the present invention.

Referring now to FIG. 5, a mobile cart 150 is illustrated according to an alternative embodiment of the present invention. Mobile cart 150 is identical to cart 10, with the following exceptions. The handle portion 30 of cart 10 is eliminated, with the cart 150 being propelled by the operator applying a pushing or pulling force to basket 14. Additionally, the upper platform portion 24 of cart 10 is replaced by an upper platform portion 152. Cart 150 includes a frame 154 which is otherwise the same as frame 12 of cart 10. As with platform portion 24 of cart 10, the upper platform portion 152 of cart 150 includes a pair of laterally spaced, substantially horizontal tubular members 156 (only one shown). Each of the tubular members 156 of cart 150 has a horizontal length exceeding those of the tubular members 50 and 52 of the upper platform portion 24 of cart 10, so that the tubular members 156 extend rearward to approximately a rear end of the depression 104 of basket 14. As with cart 10, cart 150 may alternatively be configured to omit depression 104. The function of cart 150 is the same as that described previously with respect to cart 10.

In operation, either cart 10 or cart 150 may be strategically placed in areas of large stores so as to provide convenient use for supplemental shoppers. Such areas may include, but are not limited to the store entrance, and the frozen food, meat, dairy and beverage sections of the store. The particular configuration of the frame 12 of cart 10 and frame 154 of cart 150 allows the cart operator to easily access the bottom rack 116 from either side or the rear of the corresponding cart. More specifically, since the riser portion 28 of carts 10 and 150 is substantially vertical and extends upward solely from the front end 22 of the lower base portion 18 of the corresponding one of carts 10 and 150, and since both the lower base portion 18 and upper platform portion 24 of cart 10, as well as the lower base portion 18 and upper platform portion 152 of cart 150, are substantially perpendicular to the riser portion 28 of the corresponding one of carts 10 and 150, the available storage space between basket 14 and rack 116, and the access to rack 116, are maximized for each of the carts 10 and 150. It is noted that if frame 12 or frame 154 included structural members in addition to connecting portion 20 to interconnect the lower base portion 18 and the corresponding one of the upper platform portions 24 and 152, respectively, the access to rack 116 and/or the available storage space between basket 14 and rack 116 would be compromised. The use of the centrally disposed depression 104, which lowers the center of gravity of basket 14, enhances the stability of carts 10 and 150 relative to known conventional carts. The stability of carts 10 and 150 is further enhanced by the relative sizing and positioning of basket 14 as compared to the lower base portion 18. The lightweight construction of carts 10 and 150, as well as the use of four swiveling casters 16, permits carts 10 and 150 to be easily propelled in any direction by the cart operator, which is particularly advantageous for aged shoppers. Additionally, the size of basket 14, which is smaller than that of the "large" grocery carts typically available in large retail stores, facilitates loading and unloading by the cart operator. Carts 10 and 150 are anticipated to be frequently utilized, or in substantially continuous use within a given store, and accordingly carts 10 and 150 are not designed to nest. The absence of a nesting feature permits basket 14 of each cart 10 and 150 to be fastened to frames 12 and 154, respectively, thereby eliminating potential "pinch points" created by the pivoting baskets of conventional carts which can be hazardous, particularly to children.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, although carts 10 and 150 have been illustrated for particular use as shopping, or grocery carts, carts 10 and 150 may be utilized to transport items other than those commonly available in retail grocery stores. Such an application may include the transport of supplies within an office environment. In such a case, carts 10 and 150 may also include a pair of longitudinally extending rails attached to basket 14, or alternatively, a pair of laterally extending rails attached to basket 14, with either of the pair of rails being spaced apart so as to accommodate a particular need. For instance, the pair of rails may be spaced to accommodate standard 8.5×11 inch hanging folders or alternatively, to accommodate legal size hanging folders. The invention is therefore not limited to specific preferred embodiments as described, but is only limited as defined by the following claims.

What is claimed is:

1. A mobile cart comprising:
a frame including a lower base portion, an upper platform portion vertically spaced from said lower base portion, a connecting portion extending between and attached to said lower base portion and said upper platform portion, and a handle portion attached to said upper platform portion, said handle portion including a generally horizontally extending upper tubular member;
a basket attached to said upper platform portion and vertically spaced from said lower base portion, said basket being operable for receiving articles from an operator of said cart; and
a plurality of casters mounted on said lower base portion;
wherein said connecting portion extends upward solely from a first end of said lower base portion and said platform portion is cantilevered from an upper portion of said connecting portion;
said lower base portion and said upper platform portion are connected solely by said connecting portion;
said connecting portion further includes a substantially vertical riser portion extending between and attached to said lower base portion and said upper portion of said connecting portion;
said riser portion is disposed forward of said basket and said upper tubular member of said handle portion is disposed rearward of said basket;
said frame is configured so as to dispose said basket at a comfortable working height for the operator of the cart, to provide the operator easy access to said lower base portion, and to maximize a space existing between said basket and said lower base portion.

2. The mobile cart as recited in claim 1, wherein:
said upper platform portion is substantially perpendicular to said riser portion.

3. The mobile cart as recited in claim 2, wherein:
said upper platform portion is substantially parallel to said lower base portion; and
said lower base portion, said connecting portion and said upper platform portion are made of a metallic tubular construction.

4. The mobile cart as recited in claim 3, wherein:
said first end of said lower base portion is discontinuous and includes first and second laterally extending tubular members;
said lower base portion further includes a second end comprising a third laterally extending tubular member which is longitudinally spaced from said first end, a first longitudinally extending side member interconnecting one of said first and second laterally extending tubular members of said first end and said second end, and a second, longitudinally extending side member interconnecting the other of said first and second laterally extending tubular members of said first end and said second end;
said first end, said second end and said first and second side members are substantially horizontal and combine to form a generally rectangular shape of said lower base portion.

5. The mobile cart as recited in claim 4, wherein:
said riser portion comprises first and second substantially vertical and laterally spaced tubular members, said first substantially vertical member being attached at a lower end thereof to one of said first and second members of said first end of said lower base portion, said second substantially vertical member being attached at a lower end thereof to the other of said first and second members of said first end of said lower base portion;
said upper platform portion includes first and second substantially horizontal and laterally spaced tubular members;
said upper portion of said connecting portion comprises first and second laterally spaced arcuate tubular members, said first arcuate tubular member being attached to one of said first and second substantially vertical members of said riser portion and to one of said first and second substantially horizontal members of said upper platform portion, said second arcuate tubular member being attached to the other of said first and second substantially vertical members of said riser portion and to the other of said first and second substantially horizontal members of said upper platform portion.

6. The mobile cart as recited in claim 1, further comprising:
   a substantially planar rack attached to said lower base portion, said substantially planar rack comprising a wire mesh structure.

7. The mobile cart as recited in claim 6, wherein:
   said substantially planar rack comprises a generally square-shaped rigid wire mesh structure.

8. The mobile cart as recited in claim 1, wherein each of said casters comprises a swiveling caster.

9. The mobile cart as recited in claim 1, wherein:
   said basket includes an open, generally rectangular top, a generally rectangular floor vertically spaced from said top, a pair of longitudinally spaced end walls attached to and extending upward from said floor, and a pair of laterally spaced side walls attached to and extending upward from said floor and attached to each of said end walls.

10. The mobile cart as recited in claim 9, wherein:
    said floor is constructed of a rigid mesh and said floor includes a substantially planar portion attached to said end walls and said side walls of said basket;
    said basket further includes a generally centrally disposed and downwardly extending depression formed in said floor, said depression extending below said substantially planar portion of said floor, said depression being operable for receiving articles from the operator of said cart and being effective for lowering a center of gravity of said basket thereby enhancing the stability of said cart.

11. A mobile cart comprising:
    a frame including a lower base portion, an upper platform portion vertically spaced from said lower base portion, and a connecting portion extending between and attached to said lower base portion and said upper platform portion;
    a basket attached to said upper platform portion and vertically spaced from said lower based portion, said basket being operable for receiving articles from an operator of said cart;
    a plurality of casters mounted on said lower base portion; wherein
    said connecting portion extends upward from a first end of said lower base portion and said platform portion is cantilevered from an upper portion of said connecting portion so as to dispose said basket at a comfortable working height for the operator of the cart, to provide the operator easy access to said lower base portion, and to maximize a space existing between said basket and said lower base portion;
    said connecting portion further includes a substantially vertical riser portion extending between and attached to said lower base portion and said upper portion of said connecting portion;
    said upper platform portion is substantially perpendicular to said riser portion;
    said upper platform portion is substantially parallel to said lower base portion;
    said lower base portion, said connecting portion and said upper platform portion are made of a metallic tubular construction;
    said first end of said lower base portion is discontinuous and includes first and second laterally extending tubular members;
    said lower base portion further includes a second end comprising a third laterally extending tubular member which is longitudinally spaced from said first end, a first longitudinally extending side member interconnecting one of said first and second laterally extending tubular members of said first end and said second end, and a second, longitudinally extending side member interconnecting the other of said first and second laterally extending tubular members of said first end and said second end; said first end, said second end and said first and second side members are substantially horizontal and combine to form a generally rectangular shape of said lower base portion;
    said riser portion comprises first and second substantially vertical and laterally spaced tubular members, said first substantially vertical member being attached at a lower end thereof to one of said first and second members of said first end of said lower base portion, said second substantially vertical member being attached at a lower end thereof to the other of said first and second members of said first end of said lower base portion;
    said upper platform portion includes first and second substantially horizontal and laterally spaced tubular members;
    said upper portion of said connecting portion comprises first and second laterally spaced arcuate tubular members, said first arcuate tubular member being attached to one of said first and second substantially vertical members of said riser portion and to one of said first and second substantially horizontal members of said upper platform portion, said second arcuate tubular member being attached to the other of said first and second substantially vertical members of said riser portion and to the other of said first and second substantially horizontal members of said upper platform portion;
    said first and second substantially vertical members of said riser portion diverge laterally away from one another from said lower base portion toward said upper platform portion.

12. A mobile cart comprising:
    a frame including a lower base portion, an upper platform portion vertically spaced from said lower base portion, and a connecting portion extending between and attached to said lower base portion and said upper platform portion, said upper platform portion including first and second laterally spaced tubular members;
    a basket attached to said upper platform portion and vertically spaced from said lower base portion, said basket being operable for receiving articles from an operator of said cart; and
    a plurality of casters mounted on said lower base portion;
    wherein said basket includes an open top, a floor vertically spaced from said top, a pair of longitudinally spaced end walls attached to and extending upward from said floor, and a pair of laterally spaced side walls attached to and extending upward from said floor and attached to each of said end walls;
    wherein said floor is constructed of a rigid mesh and includes a substantially planar portion;
    wherein said basket further includes a generally centrally disposed and downwardly extending depression formed in said floor, said depression extending below said substantially planar portion of said floor and being disposed laterally between said first and said second tubular members of said upper platform portion, said substantially planar portion extending over said first and said second tubular members of said upper platform portion, said depression being operable for receiving articles from the operator of said cart and being effective for lowering a center of gravity of said basket thereby enhancing the stability of said cart.

13. The mobile cart as recited in claim 12, wherein:

said depression is shaped as a hollow parallelepiped having an open top.

14. The mobile cart as recited in claim 12, wherein:

said end walls are inclined longitudinally inward from said top toward said floor;

said side walls are inclined laterally inward from said top toward said floor.

15. The mobile cart as recited in claim 14, wherein:

said side walls and said end walls are constructed of a first rigid mesh comprising a plurality of spaced, generally vertically extending struts and a plurality of vertically spaced, generally horizontally extending braces, each of said braces being attached to at least a portion of said generally vertically extending struts so as to maintain said struts in spaced relationship;

said floor is constructed of a second rigid mesh comprising a plurality of laterally spaced wires and a plurality of longitudinally spaced wires, wherein at least a portion of said plurality of laterally spaced wires is attached to at least a portion of said plurality of longitudinally spaced wires.

16. The mobile cart as recited in claim 15, wherein:

each of said struts and said braces of said first mesh and each of said wires of said second mesh comprises a metallic wire coated with a polyvinyl material.

17. The mobile cart as recited in claim 12, further comprising:

a rack attached to said lower base portion;

wherein said rack is constructed of a metallic, generally square-shaped rigid wire mesh, wherein said rigid wire mesh is coated with a polyvinyl material.

18. The mobile cart as recited in claim 12, further comprising:

a handle portion attached to said upper platform portion.

19. The mobile cart as recited claim 12, wherein each of said casters comprises a swiveling caster.

20. The mobile cart as recited in claim 12, wherein:

said basket is disposed within an upward projection of said lower base portion of said frame.

21. The mobile cart as recited in claim 12, wherein:

said connecting portion extends upward solely from a first end of said lower base portion.

22. The mobile cart as recited in claim 12, wherein:

said first and said second laterally spaced tubular members of said upper platform portion are substantially horizontal.

* * * * *